United States Patent
Higo

(10) Patent No.: US 10,238,975 B2
(45) Date of Patent: Mar. 26, 2019

(54) METHOD FOR PROVIDING BATTLE GAME, SERVER DEVICE, AND COMPUTER-READABLE RECORDING MEDIUM

(71) Applicant: GREE, INC., Tokyo (JP)

(72) Inventor: Yoshiyuki Higo, Tokyo (JP)

(73) Assignee: GREE, Inc., Tokyo (JP)

( * ) Notice: Subject to any disclaimer, the term of this patent is extended or adjusted under 35 U.S.C. 154(b) by 576 days.

(21) Appl. No.: 14/283,903

(22) Filed: May 21, 2014

(65) Prior Publication Data
US 2015/0031425 A1    Jan. 29, 2015

(30) Foreign Application Priority Data

May 22, 2013   (JP) ................................ 2013-108368
Mar. 24, 2014  (JP) ................................ 2014-059708

(51) Int. Cl.
*A63F 13/822*   (2014.01)
*A63F 13/42*    (2014.01)
*A63F 13/332*   (2014.01)

(52) U.S. Cl.
CPC ............ *A63F 13/822* (2014.09); *A63F 13/42* (2014.09); *A63F 13/332* (2014.09); *A63F 2300/206* (2013.01)

(58) Field of Classification Search
CPC ....... A63F 13/822; A63F 13/42; A63F 13/332
See application file for complete search history.

(56) References Cited

U.S. PATENT DOCUMENTS

2002/0045470 A1*  4/2002  Atsumi ................... A63F 13/10
                                                    463/1

FOREIGN PATENT DOCUMENTS

| JP | 2007-252696 A | 10/2007 |
| JP | 2008-220984 A | 9/2008 |
| JP | 2009-247474 A | 10/2009 |

OTHER PUBLICATIONS

English translation of Office action dated Sep. 1, 2015 in corresponding Japanese Patent Application No. 2015-125963, 5pp.
English translation of Japanese Office action dated Mar. 29, 2016 for corresponding JP Application No. 2015-251315, 5pp.

(Continued)

*Primary Examiner* — Robert T. Clarke, Jr.
*Assistant Examiner* — Thomas H Henry
(74) *Attorney, Agent, or Firm* — Oblon, McClelland, Maier & Neustadt, L.L.P.

(57) ABSTRACT

A method for providing a battle game in which a user repeatedly attacks and defends against an opponent using a plurality of objects placed in a plurality of areas arranged in a matrix, includes: a selection step of causing the user to select an area from the plurality of areas, and holding the area which has been already selected as a selected area; a first execution step of causing an object placed in the selected area; a determination step of determining whether or not a combination of an already selected area and the currently selected area matches at least one line which is any of a row, a column, and a diagonal of the matrix; and a second execution step of causing an object to execute a second action, in the case where the determination step determines that the combination matches the at least one line.

12 Claims, 9 Drawing Sheets

130B

| CHARACTER ID | CHARACTER NAME | ATTRIBUTE | HP | ATTACK POWER | DEFENSE POWER | PLACEMENT RANGE | ATTACK RANGE |
|---|---|---|---|---|---|---|---|
| UID012 | Xxxxxx | WATER | 300 | 150 | 120 | | |
| UID025 | Aaaaa | FIRE | 100 | 50 | 60 | | |
| UID066 | Bbbb | NONE | 150 | 150 | 10 | | |
| UID010 | Accc | WATER | 200 | 100 | 100 | | |

(56) References Cited

OTHER PUBLICATIONS

Office Action dated Sep. 26, 2018 in Japanese Patent Application No. 2017-083907 (with unedited computer generated English translation).
Notification of Reasons for Refusal issued in corresponding Japanese Application No. 2017-083907 dated Apr. 17, 2018 (with English translation).

* cited by examiner

| USER ID | PASSWORD | HISTORY INFORMATION | | | | |
|---|---|---|---|---|---|---|
| | | Lv | STATUS | PLAYING TIME | POSSESSED CHARACTERS | POSSESSED CARDS |
| UID000001 | Yr98A B77 | 45 | LOGGED IN | 156:45:16 | ID0003, ID0006 | ... |
| ⋮ | ⋮ | ⋮ | ⋮ | ⋮ | ⋮ | ⋮ |

FIG. 4
130B
| CHARACTER ID | CHARACTER NAME | ATTRIB-UTE | HP | ATTACK POWER | DEFENSE POWER | PLACEMENT RANGE | ATTACK RANGE |
|---|---|---|---|---|---|---|---|
| UID001 | Xxxxxx | WATER | 300 | 150 | 120 |  |  |
| ⋮ | ⋮ | ⋮ | ⋮ | ⋮ | ⋮ | ⋮ | ⋮ |

| CARD ID | CARD NAME | AREA IDENTIFIER | SPECIAL EFFECT |
|---|---|---|---|
| CID001 | Xxxxxx | 1 | — |
| CID002 | Yyyyy | 1,3 | — |
| CID003 | Zzzz | — | SELECT TOP ROW |
| CID004 | Wzzzz | — | SELECT 10 HP OR LESS |
| ⋮ | ⋮ | ⋮ | ⋮ |

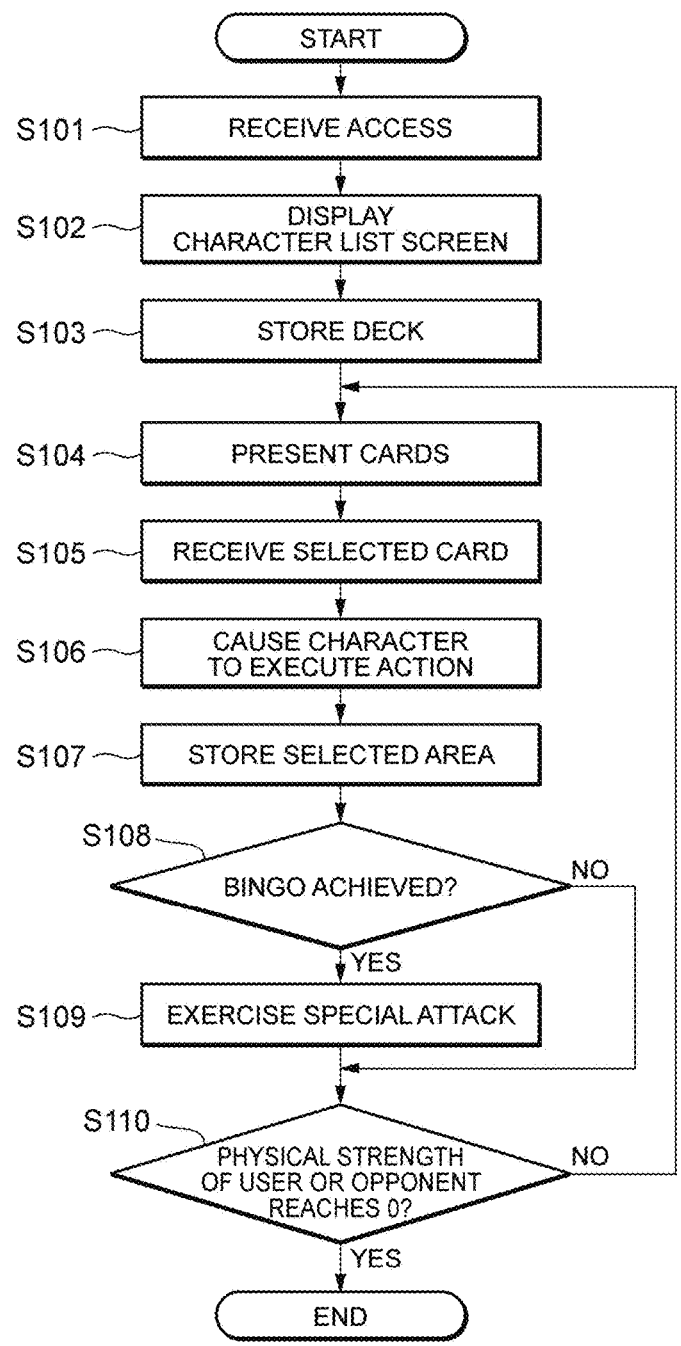

FIG. 9
130B
| CHARACTER ID | CHARACTER NAME | ATTRIBUTE | HP | ATTACK POWER | DEFENSE POWER | PLACEMENT RANGE | ATTACK RANGE |
|---|---|---|---|---|---|---|---|
| UID012 | Xxxxxx | WATER | 300 | 150 | 120 |  |  |
| UID025 | Aaaaa | FIRE | 100 | 50 | 60 |  |  |
| UID066 | Bbbb | NONE | 150 | 150 | 10 |  |  |
| UID010 | Accc | WATER | 200 | 100 | 100 |  |  |

# METHOD FOR PROVIDING BATTLE GAME, SERVER DEVICE, AND COMPUTER-READABLE RECORDING MEDIUM

FIELD

Disclosed herein are a method for providing a battle game, a server device, and a computer-readable recording medium.

BACKGROUND

Conventionally, there are many techniques relating to game systems for providing battle games using cards possessed by users. For example, Patent Document JP2008-220984 A describes a game device for playing a battle using a deck that is composed of a predetermined number of cards. In particular, Patent Document JP2008-220984 A discloses a technique relating to a game device that includes control means for outputting, as advice, a deck evaluation message evaluating a deck selected by a game player.

SUMMARY

However, in the conventional techniques as in the game device in Patent Document JP2008-220984 A, for example a special attack such as a skill attack is exercised probabilistically, and user-involved battle development with strategic or tactical elements is not possible.

In view of the above-mentioned circumstances, embodiments disclosed herein provide a server device, a control method for the server device, a program, and a game system that enable user-involved battle development with strategic or tactical elements in a game.

A computer according to the present disclosure is a server device for providing a battle game in which a user repeatedly attacks and defends against an opponent using a plurality of objects placed in a plurality of areas arranged in a matrix, the server device including: a selection unit for causing the user to select an area from the plurality of areas, and holding the area which has been already selected as a selected area; a first execution unit for causing an object placed in the selected area, to execute a first action; a determination unit for determining whether or not a combination of an already selected area and the currently selected area matches at least one line which is any of a row, a column, and a diagonal of the matrix; and a second execution unit for causing an object to execute a second action, in the case where the determination unit determines that the combination matches the at least one line.

The term "object" means an object used in the game and visible to the user. An example of the object is a character representing a human or a monster, though the object is not limited to such.

It is desirable that the selection unit presents one or more areas as options so that the user selects the area from areas other than the already selected area.

It is desirable that the first action is at least one of an attack, a defense, a recovery, and an ability improvement.

It is desirable that the second action is an enhanced action of the first action.

The object may have, as an action range, the number of areas on which the first action is to be executed, and the first execution unit may cause the object of the user to execute the first action on, from among areas of the opponent, the number of areas as the action range of the object.

In the case where the object placed in the selected area extends across a plurality of areas, the first execution unit may cause the plurality of areas to execute the first action.

An information processing method according to the present disclosure is a method, implemented in an information processing device including a control unit, for providing a battle game in which a user repeatedly attacks and defends against an opponent using a plurality of objects placed in a plurality of areas arranged in a matrix, the method causing a computer to execute: a step of causing the user to select an area from the plurality of areas, and holding the area which has been already selected as a selected area; a step of causing an object placed in the selected area, to execute a first action; a step of determining whether or not a combination of an already selected area and the currently selected area matches at least one line which is any of a row, a column, and a diagonal of the matrix; and a step of causing an object to execute a second action, in the case where the step of determining determines that the combination matches a predetermined pattern.

A program according to the present disclosure is a program for providing a battle game in which a user repeatedly attacks and defends against an opponent using a plurality of objects placed in a plurality of areas arranged in a matrix, the program causing a computer to function as: means for causing the user to select an area from the plurality of areas, and holding the area which has been already selected as a selected area; means for causing an object placed in the selected area, to execute a first action; means for determining whether or not a combination of an already selected area and the currently selected area matches at least one line which is any of a row, a column, and a diagonal of the matrix; and means for causing an object to execute a second action, in the case where the means for determining determines that the combination matches a predetermined pattern.

A game system according to the present disclosure is a game system for providing a battle game in which a user repeatedly attacks and defends against an opponent using a plurality of objects placed in a plurality of areas arranged in a matrix, the game system including a server device and a terminal device, wherein the server device includes: a selection unit for causing the user to select an area from the plurality of areas, and holding the area which has been already selected as a selected area; a first execution unit for causing an object placed in the selected area, to execute a first action; a determination unit for determining whether or not a combination of an already selected area and the currently selected area matches at least one line which is any of a row, a column, and a diagonal of the matrix; and a second execution unit for causing an object to execute a second action, in the case where the determination unit determines that the combination matches a predetermined pattern, and wherein the terminal device includes: a communication unit for connecting to the server device; a display unit for displaying an image relating to the battle game; and an input unit for receiving the area selected by the user.

The term "game system" means a system including an information processing device and the like and for providing a specific function to the user. Examples of the game system include a server device, a cloud computing system, an application service provider (ASP) system, and a client-server model, though the game system is not limited to such.

A program according to the present disclosure may be installed or loaded into a computer, through any of various types of recording media including an optical disc such as a CD-ROM, a magnetic disk, and a semiconductor memory or by being downloaded via a communication network or the like.

In this specification, the term "unit" does not merely mean a physical component, but covers the case where the component's function is realized by software. One component's function may be realized by two or more physical components, and two or more components' functions may be realized by one physical component.

A game system according to the present disclosure is a server device for providing a battle game in which a user repeatedly attacks and defends against an opponent using a plurality of objects placed in a plurality of areas arranged in a matrix, the server device including: a selection unit for causing the user to select an area from the plurality of areas, and holding the area which has been already selected as a selected area; a first execution unit for causing an object placed in the selected area, to execute a first action; a determination unit for determining whether or not a combination of an already selected area and the currently selected area matches at least one line which is any of a row, a column, and a diagonal of the matrix; and a second execution unit for causing an object to execute a second action, in the case where the determination unit determines that the combination matches the at least one line. This enables user-involved battle development with strategic or tactical elements in a game.

BRIEF DESCRIPTION OF THE DRAWINGS

FIG. 3 is a diagram showing a user information table in Embodiment 1;

FIG. 4 is a diagram showing a character information table in Embodiment 1;

FIG. 5 is a diagram showing a card information table in Embodiment 1;

FIG. 7 is a flowchart showing process flow of the game system in Embodiment 1;

FIG. 9 is a diagram showing information extracted from the character information table in Embodiment 1.

DETAILED DESCRIPTION

The following describes Embodiment 1 with reference to FIGS. 1 to 9.

Figure 1:
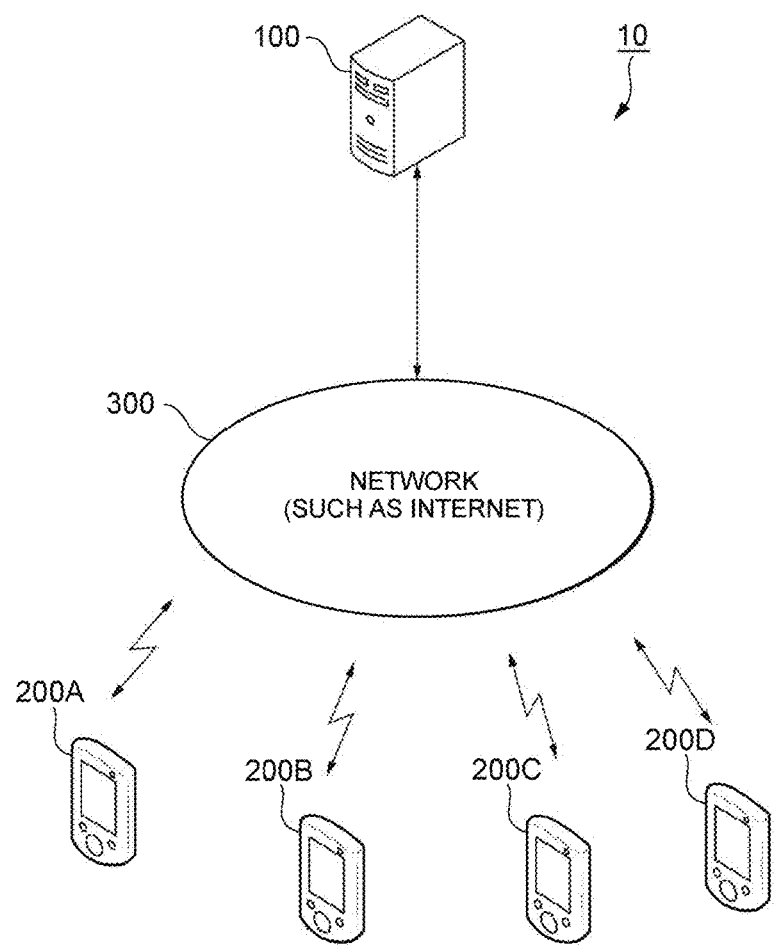
FIG. 1 is a diagram showing a structure of a game system in Embodiment 1.

FIG. 1 is a diagram showing a system structure of a game system 10 according to this embodiment. As shown in FIG. 1, the game system 10 includes a server device 100 and mobile terminals 200A to 200D (hereafter the mobile terminals 200A to 200D are collectively referred to as "mobile terminal 200"). The server device 100 is a server computer connected to a network 300 such as the Internet or a dedicated line. The mobile terminal 200 is a terminal device wiredly or wirelessly connected to the network 300, as with the server device 100. The server device 100 and the mobile terminal 200 are set to be capable of communicating with each other, thus constituting the game system 10. Though this embodiment describes the case where the game system 10 includes the server device 100 and the mobile terminal 200, the game system 10 is not limited to such. For example, the game system 10 may be a cloud computing system. In this case, the user uses the computer process of the game system 10 via a network, as a service. Alternatively, the game system 10 may be a system including an ASP server.

The mobile terminal 200 is an information processing device that communicates with the server device 100 via the network 300. Specific examples of the mobile terminal 200 include a mobile phone, a smartphone, a notebook PC, and a PDA. The mobile terminal 200 preferably includes a main control unit including a CPU and a memory, a communication unit for connecting to the network 300, an input unit such as a touch panel for receiving operations from the user, a display unit for displaying cards and decks, and the like, though not shown in FIG. 1. Though this embodiment describes the case where the terminal used by the user to access the server device 100 is the mobile terminal 200, the terminal is not limited to such, and may be, for example, a non-portable terminal device such as a desktop PC.

An overview of the game system 10 is given first, taking a game using characters as an example. The server device 100 provides a battle game in which the user and his or her opponent alternate between offense and defense in each turn using a plurality of characters placed in a plurality of areas arranged in a matrix.

The user of the game system 10 is provided with the game, by connecting to the server device 100 using the mobile terminal 200 connected to the network 300. When connected to the server device 100, the user plays the battle in the game using his or her characters. Though this embodiment describes the case where the battle is fought between the user and an enemy character (e.g. a monster) provided by the game system 10, the battle is not limited to such, and may be fought between users. The battle is made up of an offensive turn in which the user attacks using his or her characters and a defensive turn in which the user defends against attack by the opponent or the enemy character.

The user places his or her characters in any positions, to form a character set. This set of arranged characters is referred to as "deck". Before the battle, the user determines the layout of characters, and creates the deck. It is desirable that the deck as a whole has one parameter for each of attack power, defense power, physical strength, attribute, and the like. The battle may be arranged so that one loses if the physical strength of the whole deck reaches 0, or loses if the physical strength of any of the characters in the deck reaches 0.

The locations in the deck where the characters are placed are each referred to as "area". The user places the characters in the areas according to the property of each character, to form the deck. For example, a character that needs to be placed in three vertical areas, a character that needs to be placed in three horizontal areas, and the like may be used in the game. The number of areas necessary for placement is referred to as "character placement range".

Any number and positions of areas included in the deck can be set by a system administrator for each game. In this embodiment, the areas are arranged in a matrix of three rows and three columns. However, this is not a limit, and the areas may be arranged in four rows and five columns. Moreover, the number of decks that can be used in the battle game is not limited to 1. As an example, a plurality of users may use a plurality of decks when fighting one enemy character. As another example, one user may use a plurality of decks in the battle.

Each area is assigned a number as an identifier, which is displayed on the screen of the mobile terminal 200. The identifiers are not limited to numbers, and may be displayed as colors, symbols, or the like. The same identifier may be assigned to a plurality of areas. For example, in the case where the identifiers are numbers, a plurality of areas in the deck may be assigned "1". Moreover, the identifiers assigned to the enemy character's deck may be randomly determined by the server device 100 or freely determined by the user. Note, however, the following. As an example, suppose the same identifier is assigned to a plurality of areas, and as a result one identifier is absent in the deck. When this identifier is selected in the process of the below-mentioned selection unit 111A, the user cannot execute an action such as an attack. As another example, suppose the user assigns the identifier "1" to all areas in the deck, upon assignment of identifiers to areas. When "1" is selected in the process of the below-mentioned selection unit 111A, all areas are selected and bingo described later is achieved in a plurality of lines at once. When an identifier other than "1" is selected in the process of the selection unit 111A, on the other hand, the user cannot execute an action such as an attack.

In each offensive turn, the user selects an area in the deck, and has a character execute an action (first action). In the case where the combination of the already selected area (or areas, hereafter the same) and the currently selected area matches a predetermined pattern, the server device 100 causes the character to execute a special action (second action). The term "bingo" means that the combination of the already selected area and the currently selected area matches a predetermined pattern. An opened area which is in a selected state from the beginning may be included in the deck. The opened area may be determined through user selection or randomly determined at the start of the battle game. Whether or not there is any opened area and the number of opened areas may be changed based on the user information such as history information of the user, in a period after the start of the game.

Figure 2:
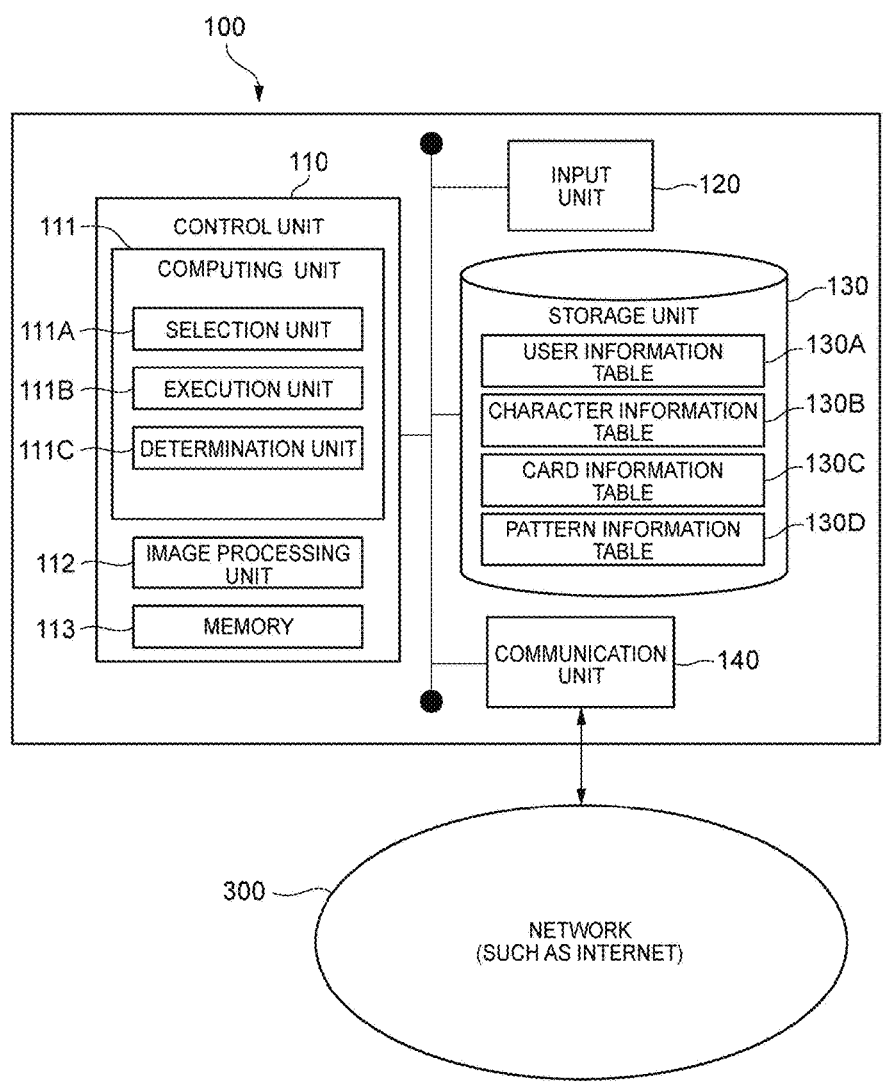
FIG. 2 is a block diagram of a server device in Embodiment 1.

The following describes each component of the server device 100 for realizing the game system 10, with reference to FIG. 2. FIG. 2 is a block diagram of the server device 100. As shown in FIG. 2, the server device 100 includes a control unit 110, an input unit 120, a storage unit 130, and a communication unit 140.

The control unit 110 includes a computing unit 111 such as a CPU or an MPU, an image processing unit 112, and a memory 113 such as a RAM. The computing unit 111 operates various functional units, by executing programs stored in the storage unit 130 based on various inputs. The programs stored in a recording medium such as a CD-ROM or distributed via the network 300 may be installed in the computer. The memory 113 is used for temporarily storing a server program, a game program, and various data necessary for operations and the like during the execution of processes in these programs.

The image processing unit 112 generates images to be transmitted to the mobile terminal 200 of the user. The generated images include images of characters, cards, and decks described later.

The input unit 120 receives operations from the administrator of the server device 100, and is realized by a keyboard, a mouse, a touch panel, and the like.

The storage unit 130 is a storage device such as a hard disk, and stores various programs necessary for the execution of processes in the control unit 110, data necessary for the execution of various programs, and the like. In detail, the storage unit 130 desirably holds a user information table 130A, a character information table 130B, a card information table 130C, and a pattern information table 130D.

FIG. 3 is a diagram showing the user information table 130A. The user information table 130A includes user information of each user such as a user ID, a password, and history information (level, status, playing time, possessed characters, possessed cards) which is the game history of the user, as shown in FIG. 3.

FIG. 4 is a diagram showing the character information table 130B. Each character has parameters and range properties. The parameters of the character may include attribute, attack power, defense power, physical strength, and rarity. For instance, the rarity is desirably ranked according to the rarity value of the item. The parameters of the character may also include speed. As an example, a character with higher speed may be able to execute more actions in one turn or make a preemptive attack.

The range properties of the character may include an action range indicating the number of areas on which the first action is to be executed, and a placement range indicating the number of areas necessary to place the character in the deck. An example of the action range is an attack range indicating the number of areas in which the character can damage the opponent when attacking the opponent. The attack range may be determined depending on the type of attack, various parameters, remaining HP (Hit Point), and remaining MP (Magic Point) of the character. The character information table 130B includes these range properties and parameters (attribute, attack power, defense power, physical strength, etc.) of each character in association with a character ID and a character name, as shown in FIG. 4. The parameters of the character may include an action property. The action property indicates the character's tendency regarding ease of action such as an attack, a defense, a recovery, an ability improvement (skill improvement), and speed. It is desirable that the below-mentioned execution unit 111B causes the character to execute the first action based on the action property. For example, in the case where the character is set to make a magic attack in the action property and the MP indicating the number of times the magic attack can be made is available, the magic attack is given priority. In the case where the character is set to make the magic attack but the MP reaches 0, a strike attack may be made as the easiest action next to the magic attack. Which of the user and the opponent attacks first may be determined depending on the action property such as speed.

FIG. 5 is a diagram showing the card information table 130C. The term "card" means a card on which an option for the user to select a given area from the plurality of areas is written. Though this embodiment describes, as an option, a card on which an area identifier is written, the present disclosure is not limited to such.

Each card has a special effect and an area identifier written on it. A plurality of identifiers may be written on the card. An example of the special effect is an effect of enhancing the parameter, such as speed, attack power, or defense power, of the character placed in the area having the identifier written on the card. A card with an area-independent special effect such as an effect of enabling actions of all characters, an effect of enabling actions of all characters whose HP is less than or equal to a predetermined level, or an effect of enabling actions of all characters in one row or in one column may be provided, too. The card information table 130C includes such a special effect and area identifier of each card in association with a card ID and a card name, as shown in FIG. 5.

Figure 6:
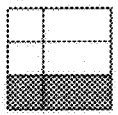
FIG. 6 is a diagram showing a pattern information table in Embodiment 1.

FIG. 6 is a diagram showing the pattern information table 130D. The term "pattern" means a predetermined combination of areas arranged in the matrix. Examples of the pattern include a row, a column, and a diagonal. The pattern information table 130D includes each predetermined combination of areas and its pattern ID, as shown in FIG. 6.

Referring back to FIG. 2, the rest of the structure of the server device 100 is described below.

The communication unit 140 connects the server device 100 to the network 300. For example, the communication unit 140 may be realized by: a LAN card, an analog modem, an ISDN modem, or the like; and an interface for connecting it to the processing units via a transmission path such as a system bus.

The computing unit 111 includes the selection unit 111A, the execution unit 111B, and a determination unit 111C as functional units, as shown in FIG. 2.

The selection unit 111A holds an area which has been already selected from the plurality of areas, as a selected area. The area may be selected by the user or by the selection unit 111A. The selection unit 111A can temporarily store the selected area in the memory 113. In the case where the deck includes an opened area, the selection unit 111A can treat the opened area as a selected area.

It is desirable that the selection unit 111A presents one or more areas as options so that the user selects an area from the areas other than the already selected area. In detail, the selection unit 111A can create a set of cards using cards on which one or more areas are written, and cause the user to draw any card from the set. In this embodiment, in the battle the selection unit 111A causes the user to select three cards on which area identifiers are written from the set of cards, and presents the selected cards. The user selects one card upon each offensive turn, to use the card. Each time a card is used, the user can draw a new card from the set of cards. The number of cards dealt and the way of dealing cards are not limited to such. For example, the server device 100 may randomly deal cards to the user.

Moreover, the selection unit 111A can select areas in predetermined order. For example, before the user places the characters in the deck, the selection unit 111A may present the order of areas selected in a set of cards or the like, and select the areas in this order. This encourages the user to think about which characters should be placed in areas where bingo is likely to be achieved.

Further, the selection unit 111A can automatically set an area in which a character whose HP has reached 0 is placed or an area in which a character who has become unable to fight due to the opponent's attack is placed, as a selected area. Thus, when the user is driven into a more disadvantageous state, bingo is more likely to be achieved. This increases the fun of the game.

The execution unit 111B includes: first execution means for causing the character placed in the selected area to execute the first action; and second execution means for executing the second action in the case where it is determined that the combination of the already selected area and the currently selected area matches at least one line which is any of a row, a column, and a diagonal of the matrix (i.e. bingo is achieved). The first action includes at least one action out of an attack, a defense, a recovery, and an ability improvement. The second action may be an enhanced action of the first action. Examples of the second action include a special attack with higher attack power than a normal attack, an attribute attack, a full recovery, and a skill improvement. In detail, the second action may be an attack made by summoning a monster.

Upon receiving information about the card selected by the user, the execution unit 111B causes the character placed in the selected area to execute the first action, with reference to the range property and the action property of the character in the character information table 130B. For example, in the case where the character placed in the selected area extends across a plurality of areas, the execution unit 111B can cause the character to execute the first action. The execution unit 111B can also cause the character of the user to execute the first action on, from among the areas in the opponent's deck, the number of areas which is the action range of the character. The execution unit 111B may determine the number and positions of areas as the action range, depending on the parameters and type of attack such as exercised skill of the character.

The execution unit 111B can produce an effect of developing the battle game to the user's advantage, in the case where it is determined in the process of the below-mentioned determination unit 111C that bingo is achieved in a plurality of lines. Examples of the effect of developing the battle game to the user's advantage include: improving the skill of the character; giving an item usable in the game; giving points that can be exchanged with an item usable in the game; increasing attack power against the opponent; exercising a special attack; and increasing the number of areas as the action range of the character.

The determination unit 111C determines whether or not the combination of the already selected area and the currently selected area matches at least one line which is any of a row, a column, and a diagonal of the matrix, that is, whether or not bingo is achieved. In the case where bingo is achieved, the determination unit 111C notifies the execution unit 111B.

The following describes process flow of the server device 100, with reference to FIG. 7. Process steps included in the process flow described below may be optionally executed in different order or executed in parallel and also other step(s) may be added between the process steps, without causing contradiction in the processes. Besides, one step so described for convenience may be executed separately in a plurality of steps, and a plurality of steps so described for convenience may be executed as one step.

FIG. 7 is a flowchart showing process flow of the server device. First, the server device 100 receives access from the user using the mobile terminal 200A (S101). Here, a game start request is transmitted from the mobile terminal 200A to the computing unit 111. It is desirable that, before starting the game, the server device 100 requests input of login information such as a user ID and a password. Having recognized the login information, the computing unit 111 in the server device 100 acquires user-specific history information associated with the user ID from the user information table 130A in the storage unit 130, and allows the user to resume the game from where the user left last time.

When the server device 100 receives the game start request from the user, the image processing unit 112 displays a list screen of characters possessed by the user (S102). It is desirable that not only the image of each character but also the parameters, properties, number of possessions, and the like of each character are displayed in the list screen. This enables the user to form the deck based on the parameters and the like of each character.

Figure 8A:
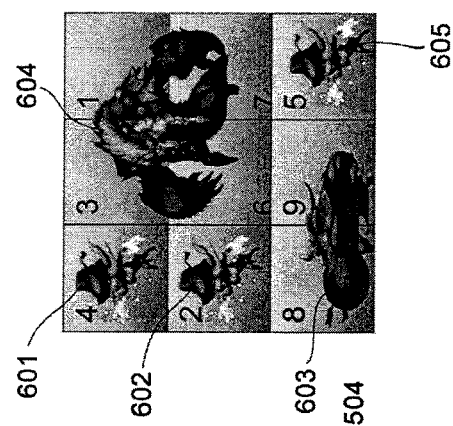
FIGS. 8A and 8B are diagrams schematically showing decks and cards in Embodiment 1.

The user selects characters which he or she wants to place in the deck from the character list screen, and determines, for each character, an area in which the character is placed in the deck. FIG. 8A shows an example of the deck arranged by the user. The number and combination of characters that can be placed vary depending on the placement property of each selected character. The computing unit 111 temporarily stores the deck arranged by the user in the memory 113 (S103).

The computing unit 111 causes the mobile terminal 200A to display a question of whether or not to play the battle with this deck. When the user selects "not play", the process returns to S102, and the deck creation process starts again.

Figure 8B:
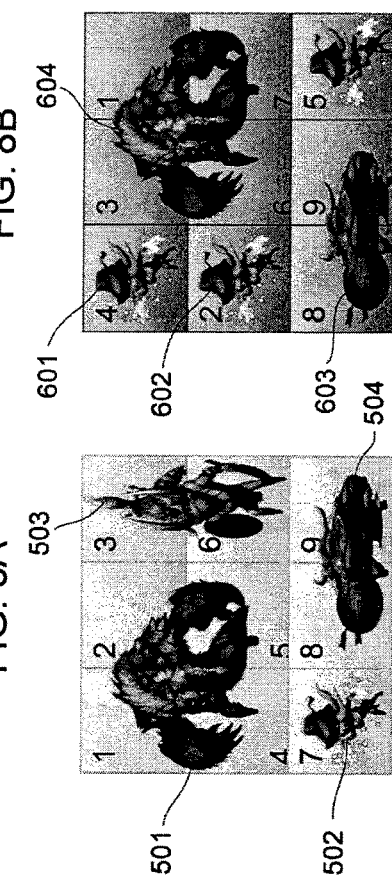

When the user selects "play battle", the deck created by the user and the enemy character's deck are displayed on the screen of the mobile terminal 200A. FIG. 8B shows an example of the enemy character's deck. Though this embodiment describes the case where the user's opponent is the enemy character provided by the server device 100, the battle may be fought between users.

The user places a character 501 in areas 1, 2, 4, and 5, a character 502 in area 7, a character 503 in areas 3 and 6, and a character 504 in areas 8 and 9, as shown in FIG. 8A. The enemy character places a character 601 in area 4, a character 602 in area 2, a character 603 in areas 8 and 9, a character 604 in areas 1, 3, 6, and 7, and a character 605 in area 5, as shown in FIG. 8B. It is desirable that the way of assigning identifiers to the areas in the deck is different between the user and the enemy character, as shown in FIGS. 8A and 8B. In this way, a tactical element of achieving bingo only in the user's deck while preventing the opponent from achieving bingo can be added to the game. The identifiers assigned to the areas of the enemy character may be randomly determined by the computing unit 111 in the server device 100, or determined by the user.

FIG. 9 shows the properties and parameters of these characters extracted from the character information table 130B. The characters 501 and 604 correspond to a character with UID012. The characters 502, 601, 602, and 605 correspond to a character with UID025. The characters 504 and 603 correspond to a character with UID066. The character 503 corresponds to a character with UID010.

The HP of the user's deck is 750, which is the sum total of the HP of the characters 501 to 504. The HP of the enemy character's deck is 750, which is the sum total of the HP of the characters 601 to 605. The battle ends when the HP of either the user's deck or the enemy character's deck reaches 0.

Figure 8C:
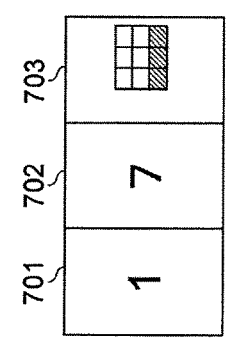
FIG. 8C shows cards drawn by the user in Embodiment 1.

When the battle starts, the selection unit 111A forms the set of cards from the cards in the card information table 130C, causes the user to select any three cards from the set, and presents the selected cards (S104). FIG. 8C shows an example of the three cards drawn by the user. When the user possesses any card, the possessed card may be included in the target of selection in the selection unit 111A.

In the example shown in FIG. 8C, cards 701 to 703 are presented as options. Area 1 is written on the card 701, area 7 is written on the card 702, and the bottom row is written on the card 703 as options. The computing unit 111 receives a card selected by the user (S105).

Based on the selected card, the execution unit 111B causes the corresponding character to execute the first action, by referring to the action property of the character (S106). For example, in the case where the card 701 is selected, the character 501 of the user and the character 604 of the enemy character placed in area 1 execute actions. Since the attack range of each of the characters 501 and 604 is four areas, the character can attack one or more characters placed in four areas in the opponent deck. The four areas to be attacked may be any four areas. Alternatively, the four areas to be attacked may be four areas including an area in which a character with the highest HP is placed.

In the case where the card 702 is selected, the character 502 of the user and the character 604 of the enemy character placed in area 7 execute actions. The attack range of the character 502 is one area, whereas the attack range of the character 604 is four areas. Accordingly, the user is damaged in a wider range.

In the case where the card 703 is selected, each character placed in the bottom row makes an attack, regardless of the area identifiers. In detail, the characters 502 and 504 of the user and the characters 603 and 605 of the enemy make attacks. The attack range of each of the characters 502 and 605 is one area, and the attack range of each of the characters 504 and 603 is one area. Hence, both the user and the enemy character can attack a total of three areas.

It is desirable that, in the case where the HP of the character placed in the selected area is already 0, attack is disabled in the turn.

Referring back to FIG. 7, the rest of the flow is described below. The area written on the selected card is temporarily stored in the memory 113 as a selected area, during the battle (S107).

Each time a card is selected, the determination unit 111C determines, for each deck, whether or not the selected areas match any pattern in the pattern information table 130D, i.e. whether or not bingo is achieved, with reference to the memory 113 (S108).

In the case where the determination unit 111C determines that bingo is achieved (S108: YES), the execution unit 111B causes the character(s) placed in the deck to execute a special action (S109). Examples of the special action include an attack with high attack power, an attribute attack, a full recovery, and a skill improvement. The character that can execute the special action may be limited to each character with remaining HP, or may also include each character whose HP is 0.

The process from S104 to S109 is repeatedly performed until the HP of either deck reaches 0.

Other Embodiments

Though an embodiment has been described above, the present disclosure is not limited to the foregoing embodiment, and various modifications and changes are possible based on the technical idea of the present disclosure.

For example, in the foregoing embodiment, the mobile terminal 200 directly accesses the server device 100 via the network 300. However, in the case where the communication system includes a Web server, the communication with the mobile terminal 200 may be relayed by the Web server. This contributes to lower security risk.

A method according to a predetermined embodiment of the present disclosure is a method implemented in a terminal device that is operated by a user and is connectable to a server device via a communication line, the method including: a step of connecting to the server device; a step of displaying an image relating to a battle game in which a user repeatedly attacks and defends against an opponent using a plurality of objects placed in areas arranged in a matrix; and a step of receiving an area selected by the user.

A computer-readable recording medium according to a predetermined embodiment may have a program recorded thereon for causing a computer to execute a step of providing a battle game in which a user repeatedly attacks and defends against an opponent using a plurality of objects placed in a plurality of areas arranged in a matrix, the program causing the computer to execute: a step of causing the user to select an area from the plurality of areas, and holding the selected area as a selected area; a step of causing an object placed in the selected area, to execute a first action; a step of determining whether or not a combination of an already selected area and the currently selected area matches at least one line which is any of a row, a column, and a diagonal of the matrix; and a step of causing an object to execute a second action, in the case where the step of determining determines that the combination matches a predetermined pattern.

DESCRIPTION OF REFERENCE NUMERALS 10 game system
100 server device
110 control unit
111 computing unit
111A selection unit
111B execution unit (first execution unit, second execution unit)
111C determination unit
112 image processing unit
113 memory
120 input unit
130 storage unit
130A user information table
130B character information table
130C card information table
130D pattern information table
140 communication unit
200A to 200D mobile terminal
300 network
501 to 504 character
601 to 605 character
1 to 9 area
701 to 703 card

What is claimed is:

1. A method for controlling a computer including processing circuitry and a memory, the computer providing a battle game to player devices of first and second players over a computer network, in which players repeatedly execute an action to baffle against each other in each game turn, using one or more objects placed in a plurality of areas for each player, the method comprising:
storing a plurality of first combinations of areas included in the plurality of areas, as a plurality of predetermined patterns, in the memory;
storing, in the memory, placement range data and attack range data for each of the one or more objects;
assigning identifiers to the plurality of areas of each player, wherein the identifiers are assigned differently for each player;
storing a correspondence between the plurality of areas and the identifiers in the memory;
for each player, placing the one or more objects in the plurality of areas of said each player and transmitting data to the player devices for displaying said one or more objects over the computer network;
transmitting to the player devices, over the computer network, data for displaying a selection screen to select one or more of the identifiers and receiving a selection of at least one of the identifiers;
selecting a first area corresponding to selected at least one of the identifiers from the plurality of areas in each game turn;
storing the selected first area in each game turn, in the memory;
causing a first object of the one or more objects placed in the first area of the first player selected in a current game turn of the first player to execute a first action to proceed with the current game turn to battle the second player, wherein the first action is at least one of an attack, a defense, a recovery, and an ability change;
selecting at least one second object of the one or more objects in a second area of the plurality of areas of the second player to update physical strength value based on the attack range data of the first object of the first player and positions corresponding to the placement range data of the one or more objects of the second player in response to executing the first action;
updating the physical strength value of the at least one second object of the second player;
determining whether or not a second combination of the first areas stored in the memory and one or more areas determined based on the physical strength value of the one or more objects in the plurality of areas corresponds to at least one of the stored plurality of predetermined patterns; and
causing the first object of the first player to execute a second action to further proceed with the current game turn of the first player in addition to the first action, in the case when it is determined that the second combination corresponds to at least one of the stored plurality of predetermined patterns, the second action being at least one of an attack, a defense, a recovery, and an ability change.

2. The method according to claim 1, wherein said data for displaying a selection screen includes one or more areas other than the already selected area as the first area of the plurality of areas as options.

3. The method according to claim 1, wherein the second action is an enhanced action of the first action.

4. The method according to claim 1, wherein the object has, as an action range, the number of areas on which the first action is to be executed, and wherein the execution of the first action further causes the object of the user to execute the first action on, from among the plurality of areas of the opponent, areas in the action range of the object.

5. The method according to claim 1, wherein in the case where the object placed in the selected area extends across two or more areas of the plurality of areas, the execution of the first action further causes the two or more areas to execute the first action.

6. The method according to claim 1, wherein in the case when it is determined that the second combination corresponds to at least one of the stored plurality of predetermined patterns, the predetermined patterns being a plurality of lines which are any of a row, a column, and a diagonal of a matrix, an effect of developing the battle game to a user's advantage is produced.

7. The method according to claim 1, wherein in the case where the object has become unable to battle tight, the selection of the area sets the area in which the object is placed, as the first area.

8. The method according to claim 1, further comprising calculating a total value of the physical strength value of each of the one or more objects of the first player.

9. The method according to claim 1, wherein
each player is assigned a same plurality of areas,
for the first player, a first set of the identifiers are assigned to the plurality of areas, and
for the second player, a second set of the identifiers different from the first set of the identifiers are assigned to the plurality of areas, such that at least for a same area in the plurality of areas of the first and the second players having a same location, the identifier is assigned differently for the first and the second players.

10. A game system for controlling a battle game in which players repeatedly execute an action to battle against each other in each game turn, using one or more objects placed in a plurality of areas for each player, the game system comprising:

a server device; and
a plurality of terminal devices, wherein
the server device comprises processing circuitry configured to:
store, in a memory, a plurality of first combinations of areas included in the plurality of areas, as a plurality of predetermined patterns;
store, in the memory, placement range data and attack range data for each of the one or more objects;
assign identifiers to the plurality of areas of each player, wherein the identifiers are assigned differently for each player;
store, in the memory, a correspondence between the plurality of areas and the identifiers;
for each player; place the one or more objects in the plurality of areas of said each player and transmit data to the plurality of terminal devices for displaying said one or more objects over a computer network;
transmit to the plurality of terminal devices, over the computer network, data for displaying a selection screen to select one or more of the identifiers;
receive a selection of at least one of the identifiers;
select a first area corresponding to selected at least one of the identifiers in each game turn;
store, in the memory, the selected first area in each game turn;
cause a first object of the one or more objects placed in the first area of the first player selected in a current game turn of the first player to execute a first action to proceed with the current game turn to battle the second player, wherein the first action is at least one of an attack, a defense, a recovery, and an ability change;
select at least one second object of the one or more objects in a second area of the plurality of areas of the second player to update physical strength value based on the attack range data of the first object of the first player and positions corresponding to the placement range data of the one or more objects of the second player in response to executing the first action;
update the physical strength value of the at least one second object of the second player;
determine whether or not a second combination of the first areas stored in the memory and one or more areas determined based on the physical strength value of the one or more objects in the plurality of areas corresponds to at least one of the stored plurality of predetermined patterns; and
cause the first object of the first player to execute a second action to further proceed with the current game turn of the first player in addition to the first action, in the case when it is determined that the second combination corresponds to at least one of the stored plurality of predetermined patterns, the second action being at least one of an attack, a defense, a recovery, and an ability change, and
each of the plurality of terminal devices comprises:

a communication circuit configured to connect to the server device;
a display configured to display an image relating to the battle game and the selection screen to select one or more of the identifiers; and
an input circuit configured to receive the selection by the first player.

11. A server device for controlling a battle game in which players repeatedly execute an action to battle against each other in each game turn, using one or more objects placed in a plurality of areas for each player; the server device comprising:

processing circuitry configured to:
store, in a memory, a plurality of first combinations of areas included in the plurality of areas; as a plurality of predetermined patterns;
store, in the memory, placement range data and attack range data for each of the one or more objects;
assign identifiers to the plurality of areas of each player, wherein the identifiers are assigned differently for each player;
store, in the memory, a correspondence between the plurality of areas and the identifiers;
for each player; place the one or more objects in the plurality of areas of said each player and transmit data to a plurality of terminal devices, over a computer network, for displaying said one or more objects;
transmit to the plurality of terminal devices, over the computer network; data for displaying a selection screen to select one or more of the identifiers, and receive a selection of at least one of the identifiers;
select a first area from the plurality of areas corresponding to selected at least one of the identifiers in each game turn;
store, in the memory, the selected first area in each game turn;
cause a first object of the one or more objects placed in the first area of the first player selected in a current game turn of the first player to execute a first action to proceed with the current game turn to battle the second player, wherein the first action is at least one of an attack, a defense, a recovery, and an ability change;
select at least one second object of the one or more objects in a second area of the plurality of areas of the second player to update physical strength value based on the attack range data of the first object of the first player and positions corresponding to the placement range data of the one or more objects of the second player in response to executing the first action;
update the physical strength value of the at least one second object of the second player;
determine whether or not a second combination of the first areas stored in the memory and one or more areas determined based on the physical strength value of the one or more objects in the plurality of areas corresponds to at least one of the stored plurality of predetermined patterns; and
cause the first object of the first player to execute a second action to further proceed with the current game turn of the first player in addition to the first action, in the case when, determining that the second combination corresponds to at least one of the stored plurality of predetermined patterns, the second action being at least one of an attack, a defense, a recovery, and an ability change.

12. A computer for controlling a battle game in which players repeatedly execute an action to battle against each other in each game turn, using one or more objects placed in a plurality of areas for each player, the computer comprising:

storage means for storing a plurality of first combinations of areas included in the plurality of areas, as a plurality of predetermined patterns, and placement range data and attack range data for each of the one or more objects;

selection means for assigning identifiers to the plurality of areas of each player, wherein the identifiers are assigned differently for each player, wherein the storage means further stores a correspondence between the plurality of areas and the identifiers;

first execution means for placing the one or more objects in the plurality of areas of each player;

transmitting and receiving means for transmitting to a plurality of terminal devices, over a computer network, data for displaying a selection screen to select one or more of the identifiers and receiving a selection of at least one of the identifiers, wherein the selection means selects a first area corresponding to selected at least one of the identifiers in each game turn, and wherein the storage means further stores the selected first area in each game turn;

second execution means for causing a first object of the one or more objects placed in the first area of the first player selected in a current game turn of the first player to execute a first action to proceed with the current game turn to battle the second player, wherein the first action is at least one of an attack, a defense, a recovery, and an ability change, selecting at least one second object of the one or more objects in a second area of the plurality of areas of the second player to update physical strength value based on the attack range data of the first object of the first player and positions corresponding to the placement range data of the one or more objects of the second player in response to executing the first action, and updating the physical strength value of the at least one second object of the second player;

determination means for determining whether or not a second combination of the first areas stored in the storage means and one or more areas determined based on the physical strength value of the one or more objects in the plurality of areas includes the stored plurality of predetermined patterns; and third execution means for causing the first object of the first player to execute a second action to further proceed with the current game turn of the first player in addition to the first action, in the case when it is determined that the second combination corresponds to at least one of the stored plurality of predetermined patterns, the second action being at least one of an attack, a defense, a recovery, and an ability chanage.

* * * * *